(12) United States Patent
Ko

(10) Patent No.: US 6,371,554 B1
(45) Date of Patent: Apr. 16, 2002

(54) BICYCLE SADDLE

(76) Inventor: Jin Yok Ko, New Seoul Apt., 203-804, Jakjon-dong, Kyeyang-gu, Inchon 407-060 (KR)

( * ) Notice: Subject to any disclaimer, the term of this patent is extended or adjusted under 35 U.S.C. 154(b) by 0 days.

(21) Appl. No.: 09/555,958

(22) PCT Filed: Sep. 3, 1999

(86) PCT No.: PCT/KR99/00518
§ 371 Date: Jun. 7, 2000
§ 102(e) Date: Jun. 7, 2000

(87) PCT Pub. No.: WO00/13959
PCT Pub. Date: Mar. 16, 2000

(30) Foreign Application Priority Data

| Sep. 4, 1998 | (KR) | 98/36422 |
| Nov. 27, 1998 | (KR) | 98/51242 |
| Mar. 23, 1999 | (KR) | 99/9818 |
| Jun. 14, 1999 | (KR) | 99/22008 |

(51) Int. Cl.[7] ............... B62J 1/00; B62J 1/10; B62J 1/24
(52) U.S. Cl. ............ 297/201; 297/195.1; 297/202
(58) Field of Search ............ 297/195.1, 202, 297/201; 411/352, 353, 107, 999

(56) References Cited

U.S. PATENT DOCUMENTS

| 471,417 A | * | 3/1892 | Bunker | 297/195.1 |
| 595,434 A | * | 12/1897 | Burge | 297/201 |
| 604,955 A | * | 5/1898 | Avery | 297/201 |
| 612,972 A | * | 10/1898 | Leech | 297/202 |
| 654,720 A | * | 7/1900 | Englebert | 297/202 |
| 694,875 A | * | 3/1902 | Meighan | 297/201 |
| 701,390 A | * | 6/1902 | Provoost | 297/201 |
| 1,881,136 A | * | 10/1932 | Schmidt | 297/201 |
| 3,464,754 A | * | 9/1969 | Gottfried et al. | 297/284.8 |
| 3,806,968 A | * | 4/1974 | Robey | 5/660 |
| 4,142,813 A | * | 3/1979 | Laborde | 403/391 |
| 4,437,702 A | * | 3/1984 | Agosta | 297/284.8 |
| 4,730,871 A | * | 3/1988 | Sheldon | 297/284.7 |
| 4,773,705 A | * | 9/1988 | Terranova | 297/215.14 |
| 4,836,604 A | * | 6/1989 | Romano | 297/215.14 |
| 5,165,752 A | | 11/1992 | Terry | |
| 5,167,435 A | * | 12/1992 | Aldi | 297/201 |
| 5,203,606 A | * | 4/1993 | Granzotto | 297/201 |
| 5,203,607 A | * | 4/1993 | Landi | 297/214 |
| 5,387,024 A | | 2/1995 | Bigolin | |
| 6,152,524 A | * | 11/2000 | Cox | 297/201 |

FOREIGN PATENT DOCUMENTS

| DE | A1-4236932 | 5/1994 |
| WO | A1-9211175 | 7/1992 |

* cited by examiner

Primary Examiner—Peter R. Brown
Assistant Examiner—Joseph Edell
(74) Attorney, Agent, or Firm—Birch, Stewart, Kolasch & Birch, LLP

(57) ABSTRACT

A bicycle saddle which controls the force oppressing the perineal region of a human body, which enables to support the weight of a rider mainly by the hipbone and thighbone by means of reducing the force oppressing the genital region. The saddle also provides excellent ventilation, thereby minimizing the bad effects of the rider and provides for a comfort riding. The bicycle saddle is divided into at least two parts. A central part of the saddle contacting the sensitive parts of a human body is made of an elastic substance to be compressed more than the peripheral part. Further, the central part includes a level adjuster that adjusts the height of the variable saddle part from the peripheral saddle part by adjusting the height properly to the body shape of a rider. Therefore, most of the weight of the rider is supported by the peripheral part of the saddle while the weight and oppression concentrated on the central part is released. An airway is formed in the middle of the upper and lower parts of the saddle in the space between the bottom of the central groove and the variable saddle part.

6 Claims, 12 Drawing Sheets

BICYCLE SADDLE

This application is the national phase under 35 U.S.C. §371 of PCT International Application No. PCT/KR99/00518 which has an International filing date of Sep. 3, 1999, which designated the United States of America.

TECHNICAL FIELD

The present invention relates to a bicycle saddle which controls the force oppressing the perineal region of a human body.

BACKGROUND ART

The front structure of a saddle used for a bicycle, a health machine or adding equipment similar to the bicycle, all of which will be called a 'bicycle saddle' or just a 'saddle' hereinafter, is narrow for the convenience of moving bicycle pedals by human legs. And, the back structure of the saddle is wide for supporting the weight of buttocks. A bicycle saddle combined with springs to a frame of a bicycle works as a cushion. The bicycle saddle of a related art should support the weight of a person riding a bicycle(hereinafter called rider). Besides, the front part of the saddle is narrow for making a space for moving both legs to rotate the pedals, while the back part is fabricated wide for supporting the weight of a human body.

Namely, parts supporting a hipbone and a thighbone and other parts supporting the perineal region are fabricated to the contrary of a human structure, thus distributing the weight properly. Therefore, the perineal region where sensitive human organs such as the anus, genital, and the like are located provides a locally oppressed force supporting the weight on the saddle.

Accordingly, it is very inconvenient for riding a bicycle having the bicycle saddle of the related art because poor ventilation makes the crotch sweat. Moreover, the sexual nervous system may be damaged by the oppression on the genital region of a human body.

SUMMARY OF THE INVENTION

Accordingly, the present invention is directed to a bicycle saddle that substantially obviates one or more of the problems due to limitations and disadvantages of the related art.

The object of the present invention is to provide a bicycle saddle which enables to support the weight of a rider mainly by the hipbone and thighbone by means of reducing the force oppressing the genital region greatly as well as to provide excellent ventilation, thereby minimizing the bad effects of the rider and providing a comfort riding. Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention includes a peripheral saddle part wherein a central groove which is long is formed in a central part of the peripheral saddle part, and a variable saddle part installed in the central groove of the peripheral saddle part wherein a force of supporting a weight on the variable saddle part is less than that on the peripheral saddle part. The present invention further includes a level adjuster coupling the variable saddle part with the peripheral saddle part by adjusting the height of the variable saddle part from the peripheral saddle part.

It is convenient to make the level adjuster with a screw device, whereby a spring is used for keeping the balance of the variable saddle part.

An airway to let air in is formed between the variable saddle part and the peripheral saddle part.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a farther understanding of the invention and are incorporated in and constitute a part of this application, illustrate embodiments of the inventing and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. The present invention, which relates to a saddle used for a bicycle, a health machine or a riding equipment similar to the bicycle, will be described concretely about a bicycle saddle as an example.

Figure 1:
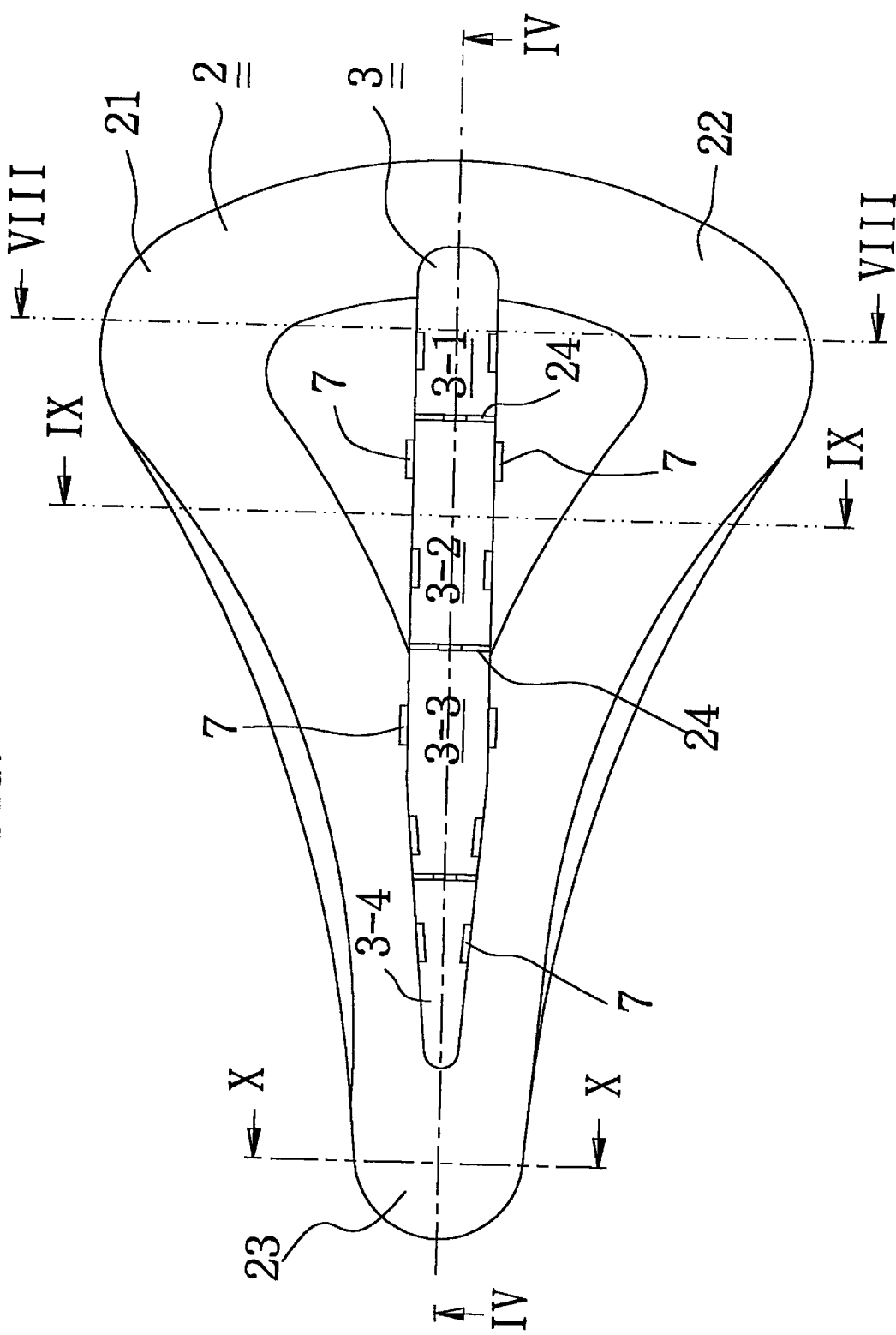
FIG. 1 is a plane view of a bicycle saddle of the present invention.
Figure 2:
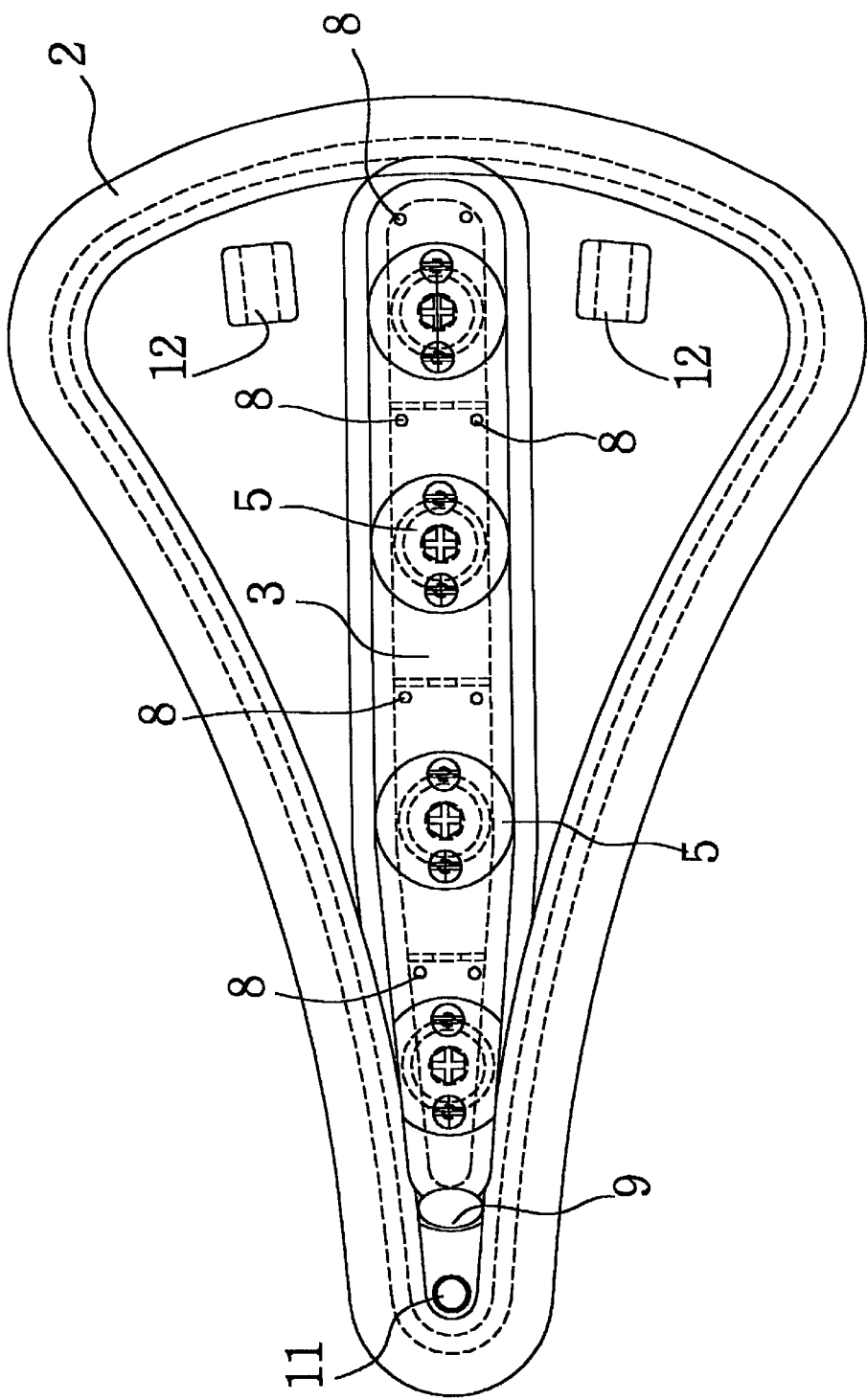
FIG. 2 is a bottom view of a bicycle saddle of the present invention.
Figure 3:
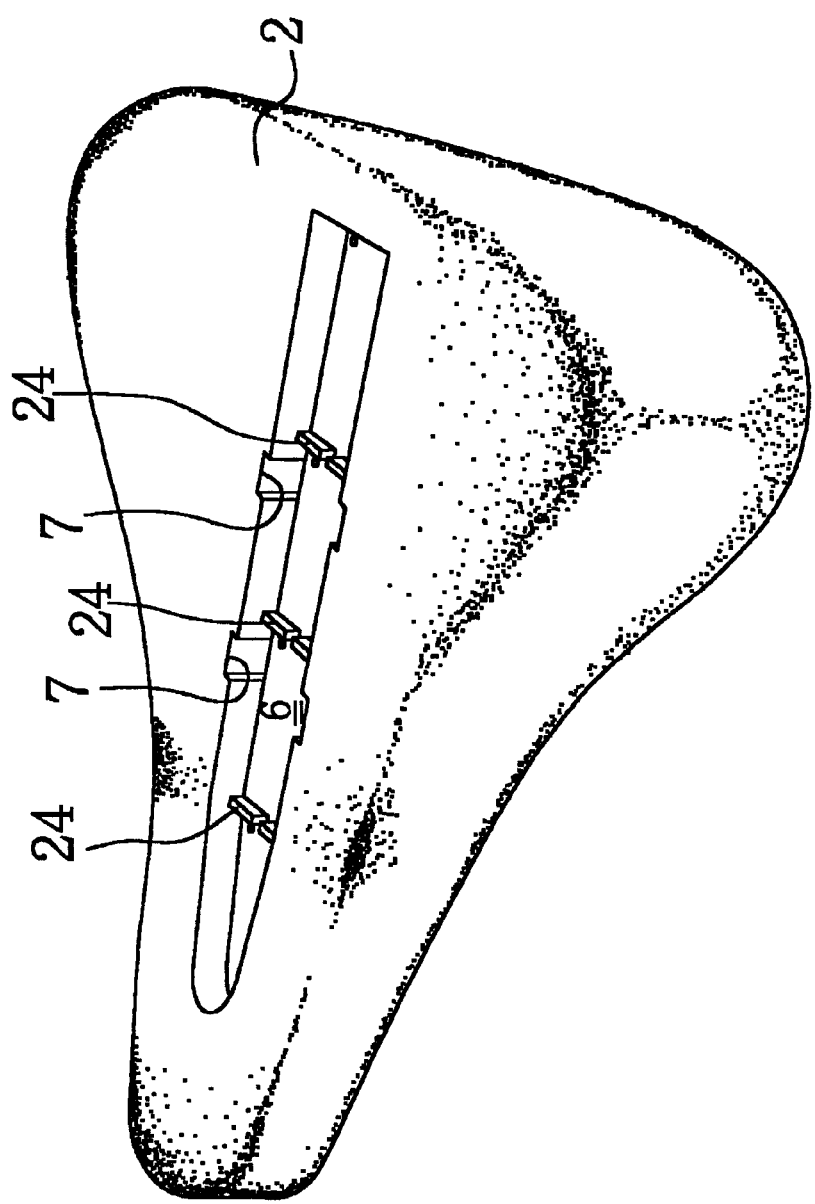
FIG. 3 is a birds eye view of a peripheral saddle part of the present invention.
Figure 4:
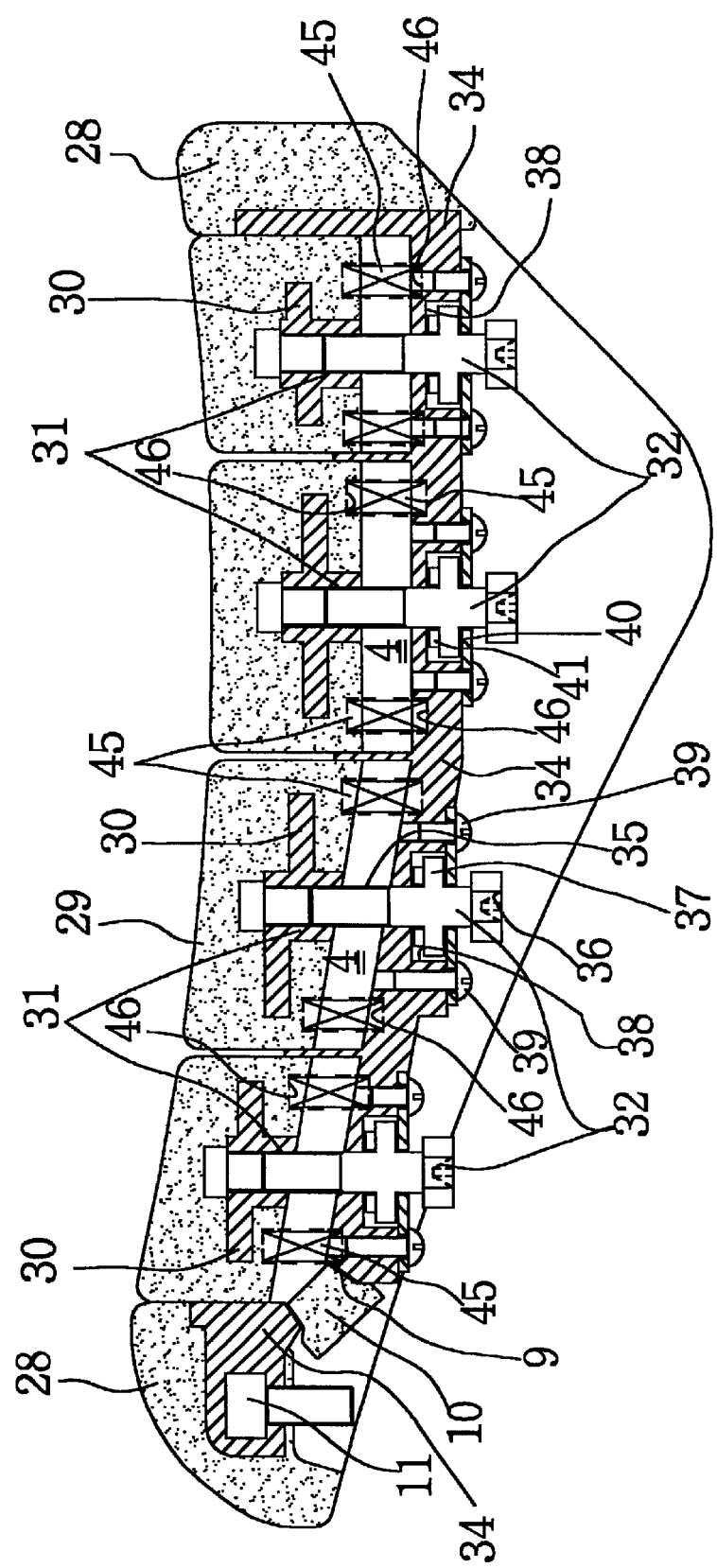
FIG. 4 is a cross-sectional view of a saddle which is bisected along with the cutting line of IV—IV in FIG. 1 according to a first embodiment of the present invention.

The present invention as shown in FIG. 1 to FIG. 3, includes a variable saddle part 3, a peripheral saddle part 2 which is installed at a saddle support attached to a bicycle frame for supporting the weight of a bicycle rider, and a level adjuster 5 which adjusts the height of the variable saddle part from the peripheral saddle part.

An outer form of the peripheral saddle part 2 has a general shape of a bicycle saddle. A long groove 6 is formed at a central part of the peripheral saddle part which is contacted with the perineal region.

The variable saddle part 3 is comprised of respective variable saddle parts 3-1 to 3–4. Each of the respective variable saddle parts is installed in the central groove 6 of the peripheral saddle part and connected to adjust its height independently from the peripheral saddle part with the level adjuster 5.

A front part 23 of the peripheral saddle part 2 has a sharp end. Wing parts 21 and 22 are formed in the rear part of the peripheral saddle part 2. An elastic part is formed on a frame of the peripheral saddle part made of a substance of which stiffness is high, providing elasticity against the weight of a rider. Partitions 24 of which centers are penetrated are formed in the central groove 6 of the peripheral saddle part 2 to house the respective variable saddle parts 3–1 to 3–4.

The wing parts 21 and 22 of the peripheral saddle part have smooth curved shape bending downward. And, exhausting holes 8 are formed to drain out water from the central groove 6 of the peripheral saddle part. Elastic part is also attached to the frame of the variable saddle part 3.

Under the front of the peripheral saddle part, a bolt 11 is embedded in the frame to be coupled with a spring which is connected to the support of a bicycle. Joint grooves 12 are formed in the rear part of the peripheral saddle part to be coupled with a bicycle frame through a spring.

The respective variable saddle parts and peripheral saddle part, as shown in FIG. 4 to FIG. 10, are coupled by the level adjuster 5. The level adjuster 5 may be constituted with bolts, level, linking apparatus and the like. Instead, the present invention introduces a constitution which enables to adjust the height successively in use of a screw.

In a first embodiment of the present invention, as shown in FIG. 4, FIG. 6A, FIG. 7A, FIG. 11, and FIG. 12, the level adjuster 5 includes female screws 31 as a first screw part formed in the respective variable saddle parts 3–1 to 3–4 and male screws 32 as a second screw part coupled with the peripheral saddle part to rotate freely to the screw-revolving direction.

The female screws 3i are formed in a frame 30 of the variable saddle part 3. And, the male screws coupled with the female screws 31 are connected to another frame 34 of the peripheral saddle part.

A screw 35 is formed in the upper part of each of the male screws 32. A driver groove 36 is formed in the lower part of the shaft of the respective male screws 32. A flange 37 is formed in the middle lower part of each of the male screws 32. Each of the male screws 32 is fixed to a lower support 40 attached by a set screw 39 wherein a groove 38 is formed in the lower part of the frame 34 of the peripheral saddle part and a buffer washer 41 is inserted on the flange 37 of the male screw 32. The lower support 40 supports the weight. The female screws are lift up or down by revolving the male screws with a driver and the like.

In this embodiment, a cushion substance 29 surrounds the frame 30 in which a nut of a female screw is embedded the variable saddle part, and another cushion substance 28 covers the upper part of the peripheral saddle part to give a rider on the saddle comfort.

When the height of the variable saddle part is adjusted by the level adjuster, balance springs 45 are installed at both sides of the respective variable saddle parts to make the variable saddle parts balanced. The balance springs are made of coil springs. A plate spring or coil spring may be installed near the screw parts. Housing groove 46 for the balance springs are formed at the central groove of the peripheral saddle part and the bottom of the variable saddle part to install the balance springs at fixed locations.

Poor ventilation through the saddle probably makes a rider sweat, which is prevented by forming air paths 7 to make air pass through between the sidewalls of the variable saddle part and peripheral saddle part and by forming an airway 9 to let air in a space 4 between the lower part of the variable saddle part and a bottom of the central groove of the peripheral saddle part. In this case, the airway 9 is closed with a stopper 10.

Figure 5:
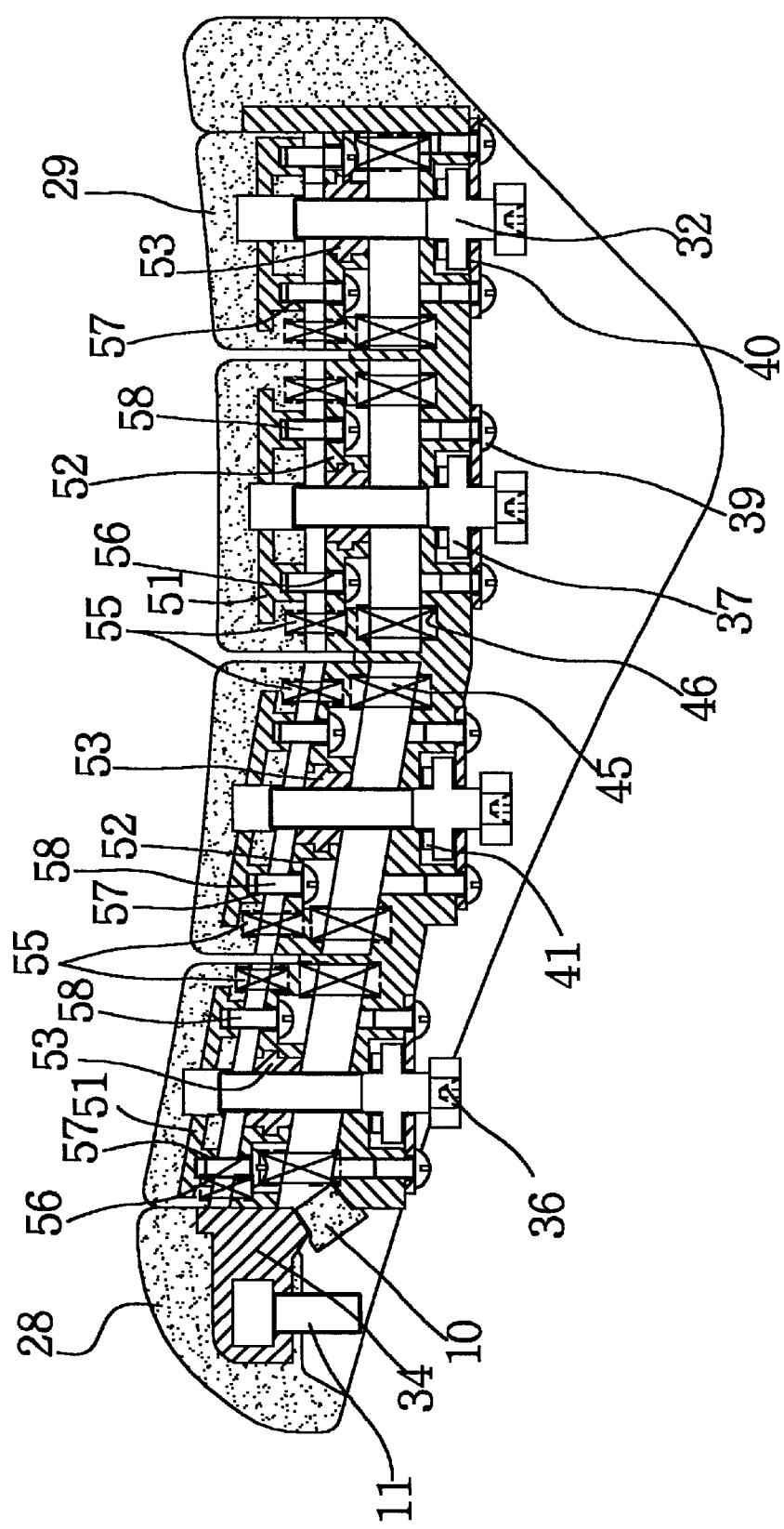
FIG. 5 is a cross-sectional view of a saddle which is bisected along the same cutting line of IV—IV in FIG. 1 according to a second embodiment of the present invention.
Figure 6A:
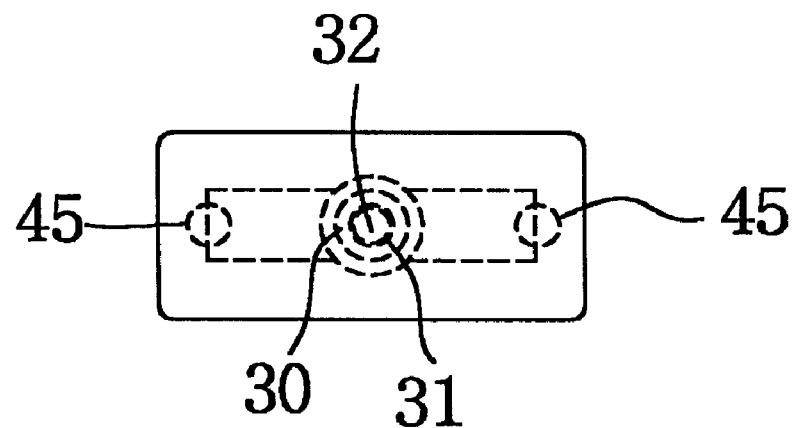
FIG. 6A and FIG. 6B are plane views of a variable saddle part of the present invention.
Figure 6B:
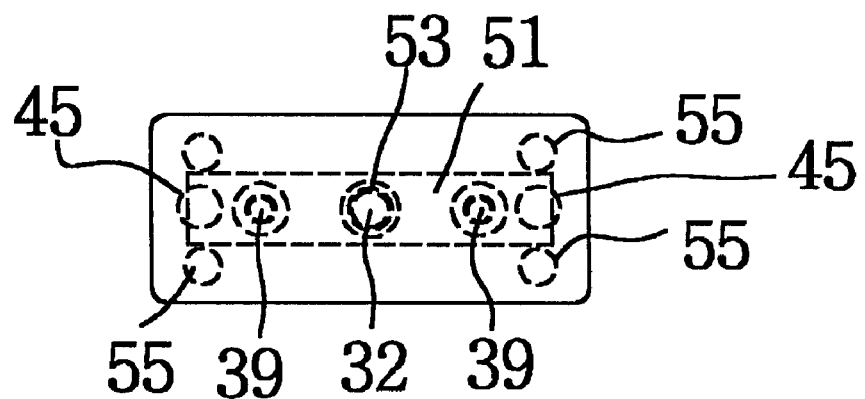
Figure 7A:
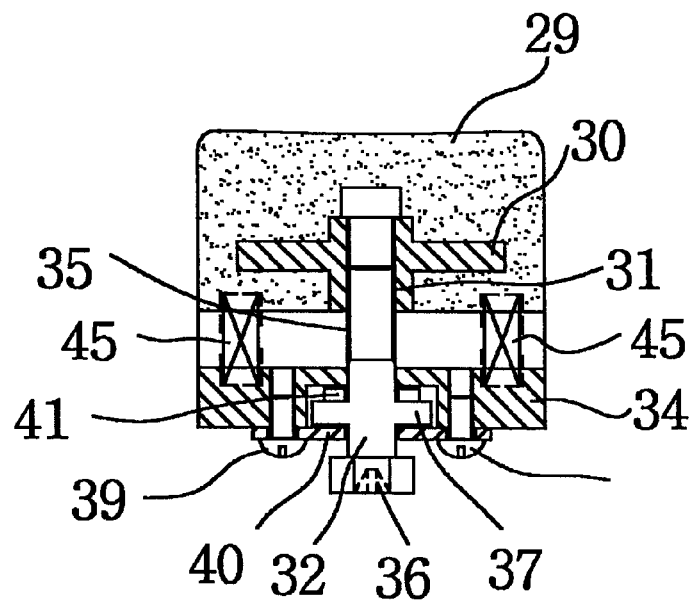
FIG. 7A and FIG. 7B are plane views of a variable saddle part in FIG. 1 bisected along with the cutting line IV—IV according to the present invention.
Figure 7B:
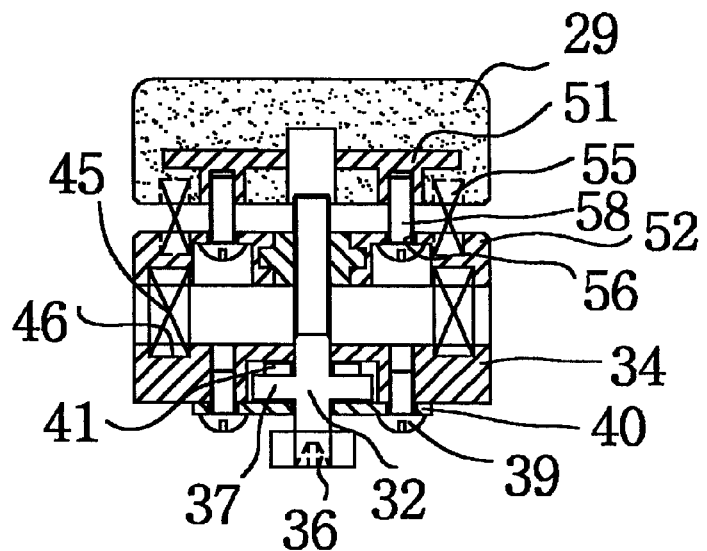

In a second embodiment of the level adjuster 5, as shown in FIG. 5, FIG. 6B, and FIG. 7B, the frames of the respective variable saddle parts 3–1 to 3–4 are divided into a first and second frame 52 and 51. The first frame 52 has a first screw part 53 to be coupled with the level adjuster. And, cushion springs 55 pushing the places between the first and second frames are installed.

A distance-limiting means, which couples the first frame with the second frame, controls the distance between the first and second frames not to displace over a predetermined interval as well as to adhere closely each other.

The distance-limiting means includes screw holes 56 formed in the first frames 52 and screw-coupled parts 57 which are coupled by set screws 58 through the screw holes 56. Thus, the displacement between the first and second frames has a limitation over a predetermined distance but the screws are free to move within the predetermined distance through the screw holes. Therefore, once the first frames are forced by the weight, the force of the cushion spring 55 is driven to the second frame.

Spring-housing grooves for the cushion springs are formed in the first and second frames. A first screw part in the variable saddle part is formed by a nut 53 embedded in the center of the first frame. A second screw part is formed in the peripheral saddle part. Male screws 32 of the second screw part are coupled with the frame 34 of the peripheral saddle part.

As explained in the description of the first embodiment, A screw 35 is formed in the upper part of each of the male screws 32. A driver groove 36 is formed in the lower part of the shaft of the respective male screws 32. And, a flange 37 is formed in the middle lower part of each of the male screws 32. Each of the male screws 32 is fixed to a lower support 40 attached by a set screw 39 wherein a groove is formed in the lower part of the frame 34 of the peripheral saddle part and a buffer washer is inserted on the flange 37 of the male screw 32. The lower support 40 supports the weight. The female screws are lift up or down by revolving the male screws with a driver and the like.

In the second embodiment, a cushion substance 29 surrounds the second frame 51 in which a nut of a female screw is embedded the variable saddle part, and another cushion substance 28 covers the upper part of the peripheral saddle part to give a rider on the saddle comfort.

Besides, installation of balance springs 45 and formation of air paths 7 and an airway 9 are the same as explained in the description of the first embodiment.

Figure 11:
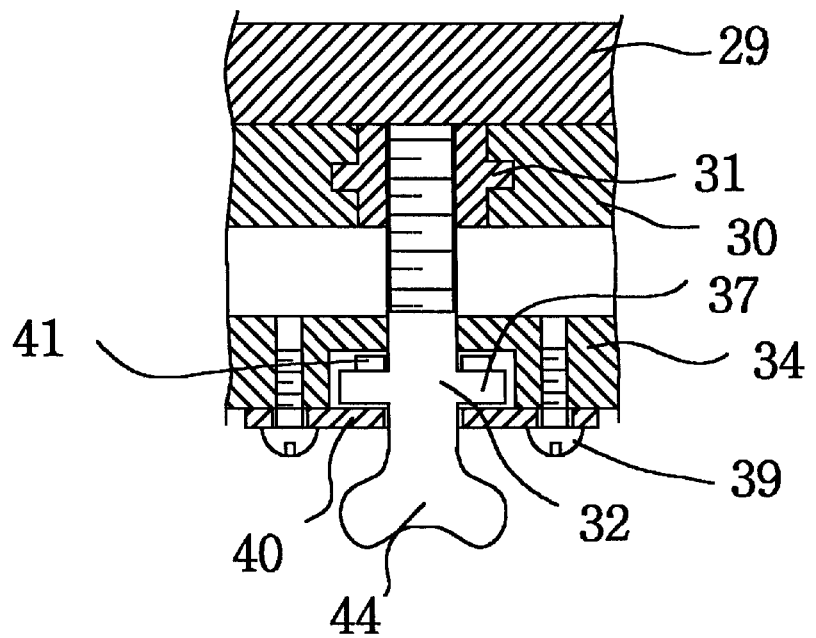
FIG. 11 is a cross-sectional view of a level adjuster of an embodiment of the present invention.
Figure 12:
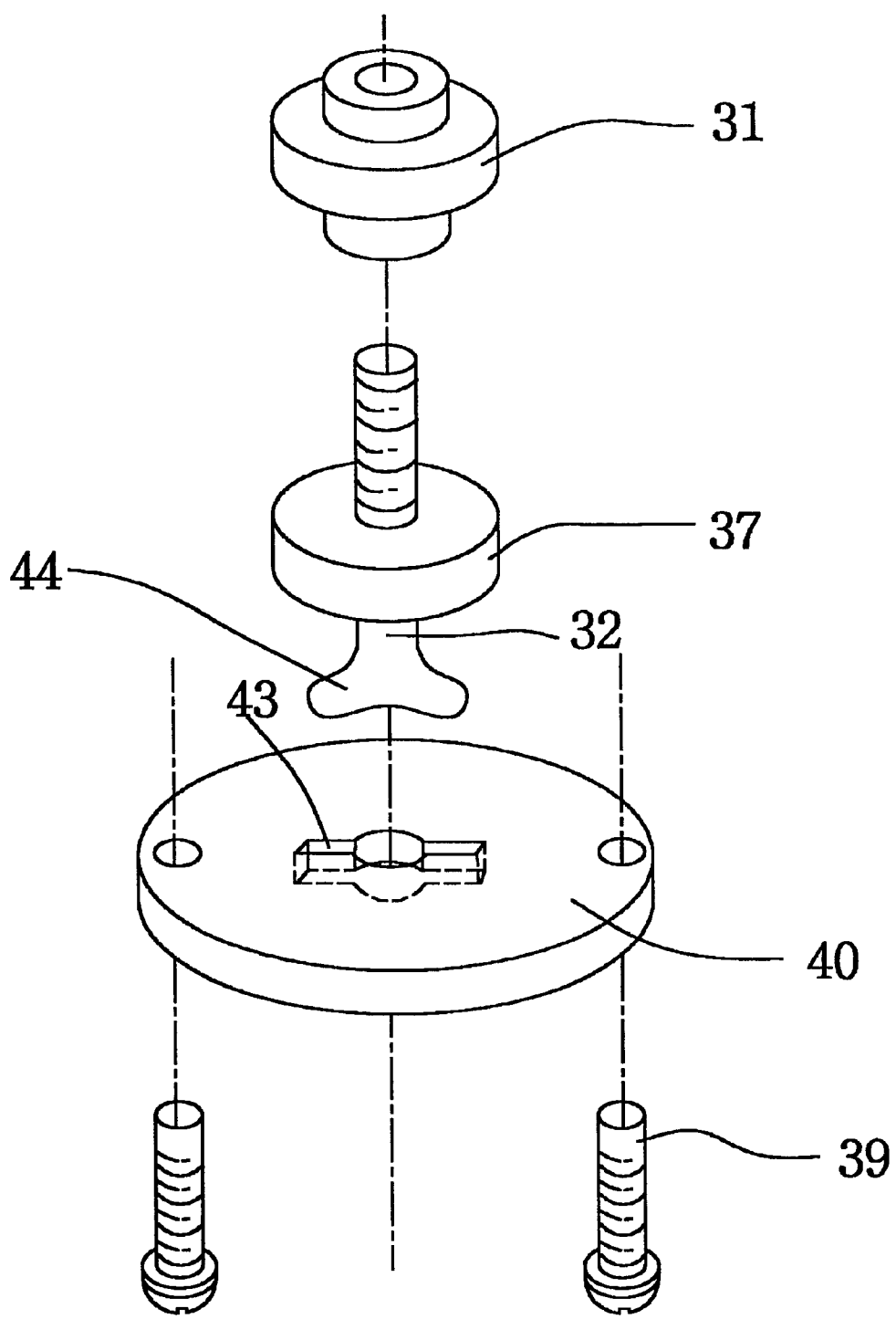
FIG. 12 is a bird's eye view of the elements of the level adjuster which is disassembled.

Relating to a following embodiment of a level adjuster, as shown in FIG. 11 and FIG. 12, the head of the male screw has a shape of butterfly knob 44. A hole 43 to have the butterfly knob 44 pass through is formed in the lower support 40. Other constitutions are the same as is in the above explanation. Therefore, it is very convenient to adjust the level by revolving the butterfly knob with a bare hand without a screw-driver or a pin.

Figure 13:
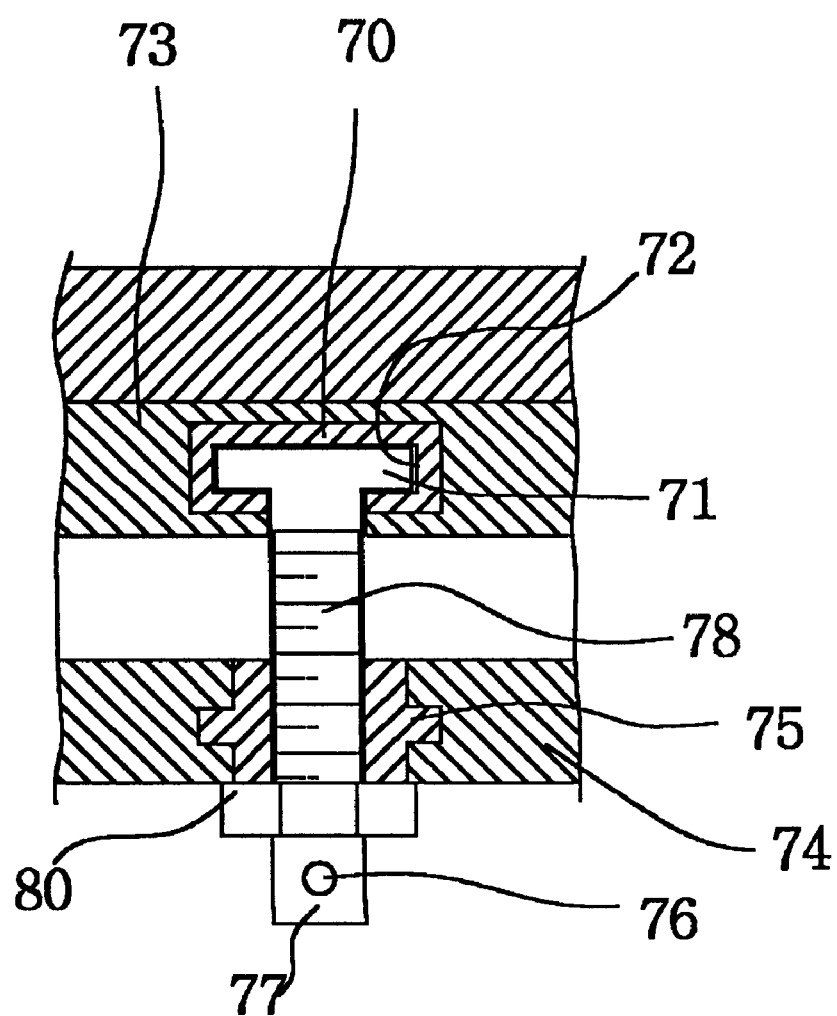
FIG. 13 is a cross-sectional view of a level adjuster of another embodiment of the present invention.
Figure 14:
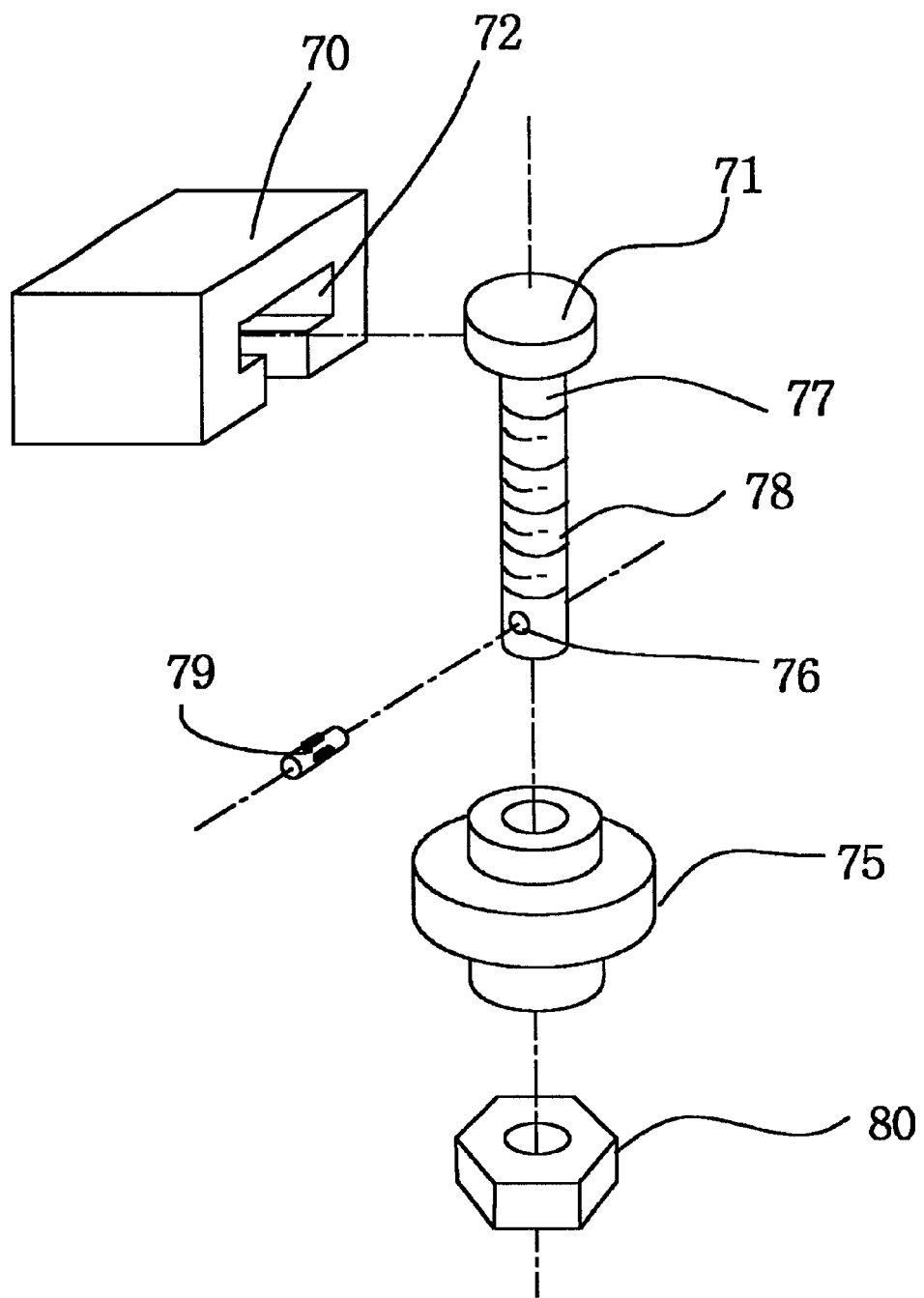
FIG. 14 is a bird's eye view of the elements of the level adjuster which is disassembled in FIG. 13.

In the next embodiment of a level adjuster, as shown in FIG. 13 and FIG. 14, a rail 70 having a guiding groove 72 to make a head 71 of a male screw revolve is embedded in a frame 73 of the variable saddle part. A nut 75 is embedded in another frame 74 of the peripheral saddle part. A penetrating hole 76 or a driver groove (not shown in the drawing) is formed horizontally at the end of a male screw 77 coupled in the above structure. A bolt head 71 of the male screw 77 is coupled with the guiding groove 72, and a screw part 78 of the bolt is coupled with the nut. The bolt head is revolved in the guiding groove by rotating the bolt with a driver, a pin 79, or the like, thereby controlling the interval between the variable and peripheral saddle parts by the screw part including the bolt and nut. After the adjustment, the height is fixed by fastening a nut 80.

Figure 8:
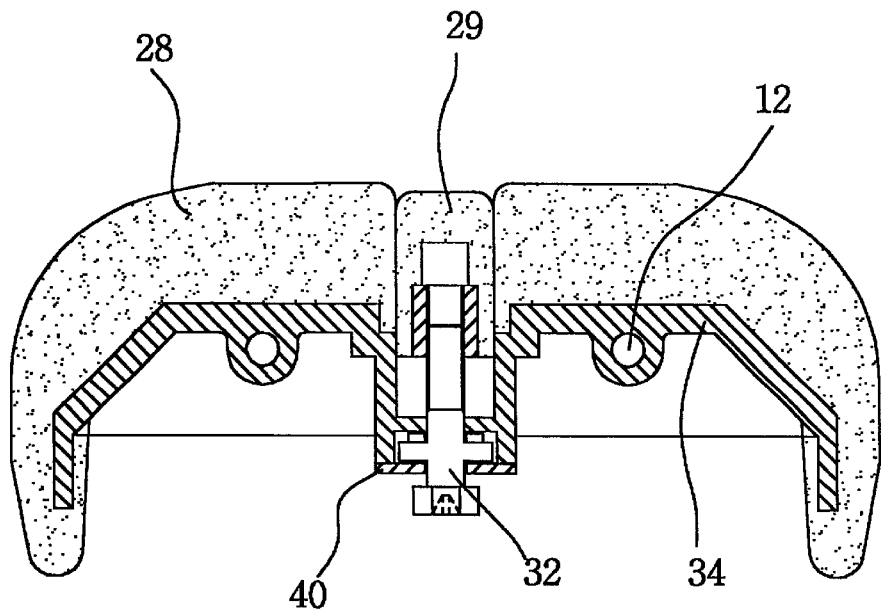
FIG. 8 is a cross-sectional view bisected along with the cutting line Vlll—Vlll in FIG. 1.
Figure 9:
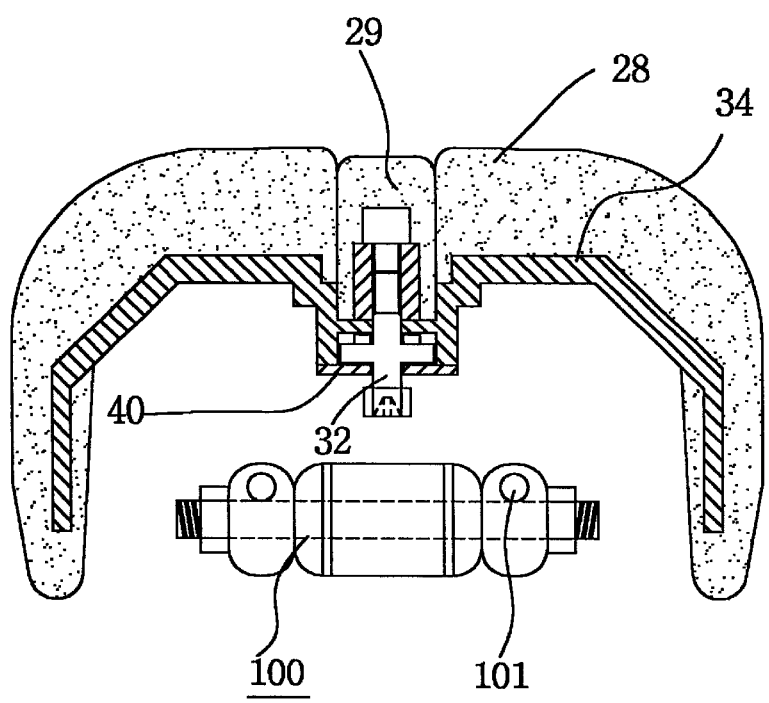
FIG. 9 is a cross-sectional view bisected along with the cutting line IX—IX in FIG. 1.
Figure 10:
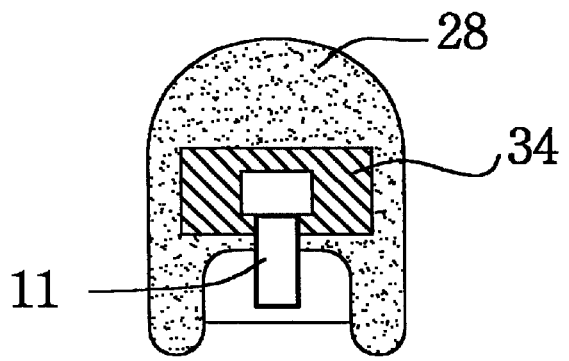
FIG. 10 is a cross-sectional view bisected along with the cutting line X—X in FIG. 1.

The cross-sectional view of the rear part of the saddle is the same as is shown in FIG. 8 and FIG. 9, and, the other cross-sectional view of the front part is the same as is shown in FIG. 10.

The numeral 100 in FIG. 9 indicates an example of a saddle-coupling means which is coupled with the bicycle frame. The numeral 101 indicates a coupling spring, one end of which is coupled with the coupling hole 12 in FIG. 8 and the other end of which is coupled with the bolt 11 in FIG. 10. In this case, the other end of the coupling spring has a shape of ring.

INDUSTRIAL APPLICABILITY

Accordingly, the bicycle saddle of the present invention enables to reduce negative side effects caused by the bicycle saddle of the related art. Namely, the side effect due to the force oppressing the perineal region is eliminated, and the adjusted level of the saddle provides a massage function. Moreover, the present invention provides a comfortable ride on a bicycle by the air ventilation through the airway by opening the ventilation stopper.

It will be apparent to those skilled in the art that various modifications and variations can be made in a bicycle saddle of the present invention without departing from the spirit or scope of the inventions. Thus, it is intended that the present invention cover the modifications and variations of this invention provided they come within the scope of the appended claims and equivalents.

What is claimed is:

1. A saddle for supporting of a human body comprising:
  a peripheral saddle part having a frame, an elastic part attached to the frame and a central groove formed in an central part of the peripheral saddle wherein at least one outlet for exhausting a fluid being formed in the central groove;
  a variable saddle part installed in the central groove of the peripheral saddle part, having at least two respective variable saddle parts, each variable saddle part having frames and elastic parts;
  a level adjuster coupling the variable saddle part to the peripheral saddle part to adjust a height of the variable saddle part from the peripheral saddle part, the level adjuster having a first screw part formed at the frame of the variable saddle part and a second screw part coupled rotatably with the frame of the peripheral saddle part, the second screw part being connected to the first screw part by screw-coupling;
  at least two balancing springs installed in the central groove of the peripheral saddle part and a bottom of the variable saddle part for balancing an upper level of the variable saddle part to an upper level of the peripheral saddle part;
  at least one air path to make air pass through which is formed between sidewalls of the variable saddle part and the peripheral saddle part; and
  an air way inlet hole is formed to let air in a space between the lower part of the variable saddle part and a bottom of the central groove of the peripheral saddle part.

2. The saddle according to claim 1, wherein the frame of the variable saddle part comprises:
  a first frame and a second frame, the first screw part is formed in the first frame to be coupled with the level adjuster;
  a cushion spring is installed for pushing in a space between the first and second frames;
  a distance limiting means is coupled with the first frame and the second frame for controlling the distance between the first and second frames which is not to be displaced over a predetermined interval as well as to adhere closely to each other, the distance limiting means moving elastically by force of the cushion spring when the second frame is pushed to the direction of the first frame in accordance with a weight load of the variable saddle part.

3. The saddle according to claim 2, the distance-limiting means comprising:
  a screw hole formed in the first frame;
  a screw-coupled part formed in the second frame; and
  a screw for coupling the first frame through the screw hole to the second frame,
    wherein the second frame is unable to move over a predetermined displacement from the first frame by coupling the screw with the screw-coupled part through the screw hole.

4. The saddle according to claim 1, wherein partitions are formed for accommodating the variable saddle parts in the central groove of the peripheral saddle part.

5. The saddle according to claim 1, wherein the first screw part further comprises a nut embedded in a middle of the frame of the variable saddle part, and the second screw part comprises a male screw having a flange at a middle part thereof, a penetrating hole for the screw to penetrate into the frame of the peripheral saddle part and a groove for housing the flange to be fixed with a fixing plate near the penetrating hole, so that the screw is coupled with the nut by screw coupling such that the flange at the middle part of a male screw is inserted into the groove.

6. The saddle according to claim 1, wherein the level adjuster comprises:
  a bolt having a head, a screw part, and a revolving means formed at an end of the screw part,
  a rail having a guiding groove to make the head of the bolt revolve in the frame of the variable saddle part,
  a nut formed in the frame of the peripheral saddle part,
  so that the height of the variable saddle part is controlled by revolving the bolt engaged at the nut.

\* \* \* \* \*